United States Patent Office 2,951,089
Patented Aug. 30, 1960

2,951,089

ALKYL ETHERS OF POLYIODOPHENYL PROPIONIC ACIDS

Helen Florence Ginsberg, Montclair, and Domenick Papa, Bloomfield, N.J., assignors to Schering Corporation, Bloomfield, N.J., a corporation of New Jersey No Drawing. Filed Dec. 28, 1953, Ser. No. 400,812

8 Claims. (Cl. 260—519)

This invention relates to a new group of compounds having X-ray contrast properties and to a process for manufacturing the same.

More particularly, the invention relates to polyiodinated phenyl fatty acids which contain a non-nuclear lower alkoxy group and exhibit a specific selectivity for visualization of the gall bladder.

The compounds of the present invention include the acids of the following general formula:

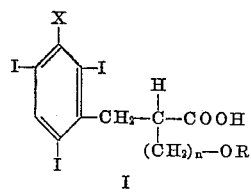

I and their non-toxic metal and amine salts, X being hydroxyl or amino, while R is a lower alkyl group, $n$ is an integer from 0–4 and the group $-(CH_2)_nOR$ contains not more than 7 carbon atoms.

The compounds of the present invention can be prepared from m-hydroxy benzaldehyde by the series of steps illustrated in the following equations:

(1)

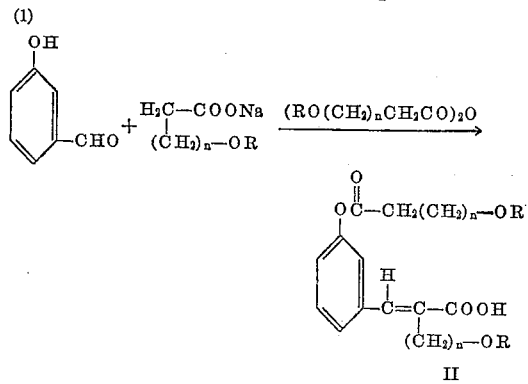

The initial condensation of the m-hydroxy benzaldehyde can be carried out with the alkali metal salts of the alkoxy-aliphatic acid in the presence of the alkoxy-acid anhydride. Reduction of the cinnamic acid (II) may be carried out by any of the known catalytic hydrogenation methods, such as hydrogen with Raney-nickel catalyst in an alkaline or alcoholic solution of the acid, or with platinum oxide catalyst in an alcoholic solution of the acid, as well as by other methods, such as by the use of sodium amalgam. After the reduction, mild alkaline hydrolysis regenerates the free nuclear hydroxyl group.

The iodination of the substituted propionic acid (III) to the triiodo derivative can be carried out by the use of the iodine-potassium iodide method in alkaline solution, or by the use of iodine monochloride in dilute acetic acid solution. Occasionally, both methods yield some diiodo compound, which is probably 2,4-disubstituted. In this case, further iodination of the diiodo-substances yields the triiodo compound. The triiodo acids of this invention are crystalline substances which are soluble in sodium bicarbonate solution and also in the usual organic solvents.

Preferably, all the compounds of general Formula I may be prepared by first reacting m-nitrobenzaldehyde with the appropriate acid anhydride and sodium salt. For example, reacting m-nitro benzaldehyde with ethoxy-acetic anhydride and sodium ethoxy-acetate in known manner yields α-ethoxy m-nitrocinnamic acid (IV). When IV is reduced in alkaline solution in the presence of Raney-nickel, there is formed α-ethoxy-β-(3-aminophenyl)-propionic acid (V) which, upon treatment with iodine monochloride, gives α-ethoxy-β-(2,4,6-triiodo-3-aminophenyl)-propionic acid (VI), in accordance with the following equations:

(2)

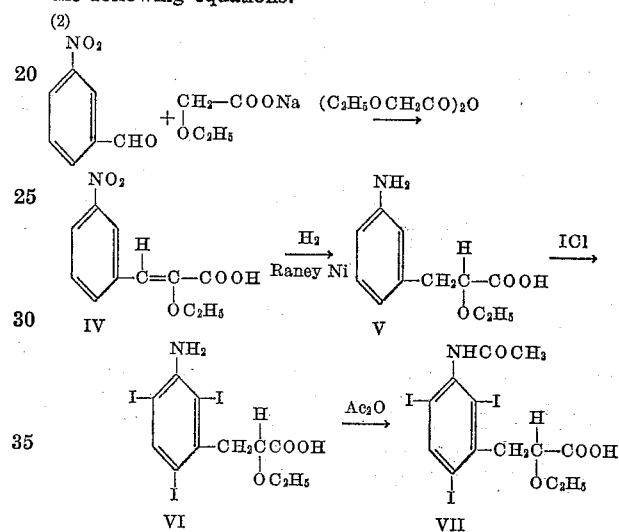

Acylation of VI with acetic anhydride, for example, yields the corresponding acetylamino compound (VII). In similar manner, other acylamino, for example the propionylamino and other lower aliphatic acylamino, and also the benzoylamino derivatives of VI, and the same acylamino derivatives of the other acids falling within Formula I wherein X is $NH_2$, can be obtained.

The amino compound VI may be transformed into other compounds of general Formula I by replacement of the amino group by hydrogen, hydroxyl or iodine. These replacements are easily effected by converting VI into its diazonium salt and treating said diazonium salt with the appropriate reagent. For such conversions, for example, replacement by hydrogen may be effected by refluxing the diazonium salt VIII with ethanol in the presence of cuprous ion, or by treatment with hypophosphorus acid, to give α-ethoxy-β-(2,4,6-triiodophenyl)

propionic acid (IX), as illustrated in the following sequence:

(3) 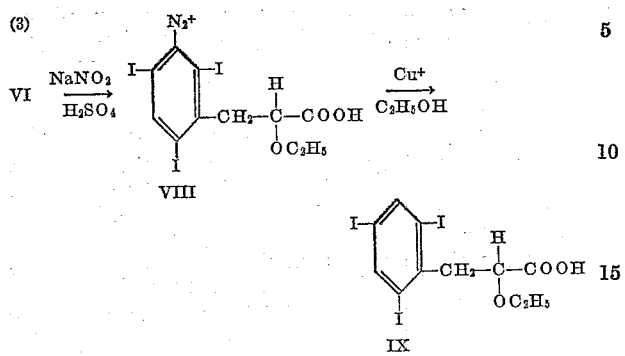

On the other hand, the diazonium salt VIII may be reacted with aqueous sulfuric acid, thereby effecting replacement of the diazonium group by hydroxyl and yielding α-ethoxy-β-(2,4,6-triiodo-3-hydroxyphenyl) propionic acid (X).

(4) 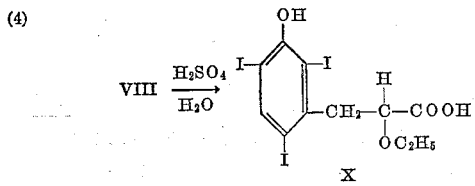

However, we prefer not to subject the iodinated compounds to strong acid and thus prefer to diazotize V, followed by treatment with aqueous sulfuric acid to give compound III where $n=0$. Iodination of the hydroxy compound yields X as shown below.

(5) 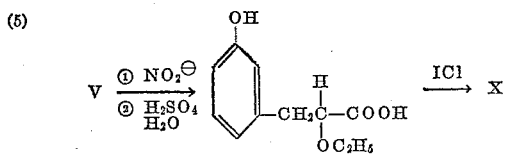

Finally, the diazonium group may be replaced by iodine, resulting in the formation of tetra-iodinated compounds of general Formula I, as illustrated below:

(6) 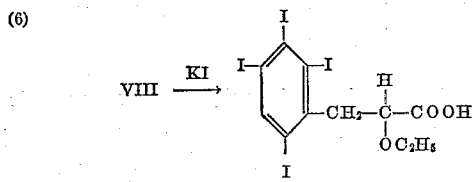

Although we prefer to carry out the Perkin condensation initially as indicated in the foregoing, it is possible, in some cases, to prepare compounds of general Formula I according to the following sequence:

(7) 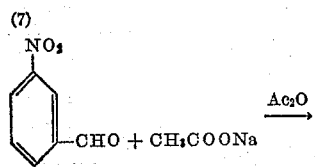

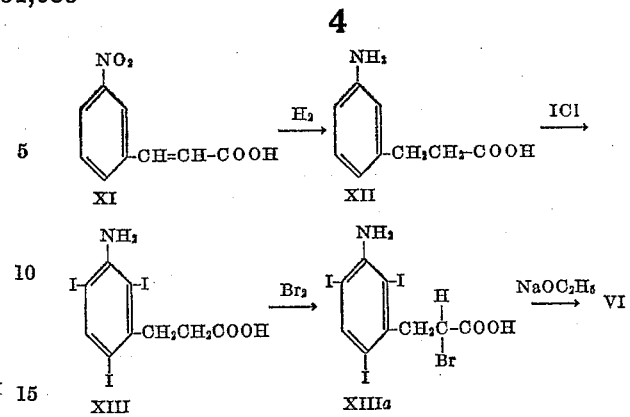

Reaction of m-nitrobenzaldehyde with sodium acetate and acetic anhydride, for example, affords in the usual manner, m-nitrocinnamic acid (XI). Hydrogenation of XI with Raney nickel or platinum oxide yields β-(3-aminophenyl) propionic acid (XII) which, upon iodination, gives β-(2,4,6-triiodo-3-aminophenyl) propionic acid (XIII). Bromination in the alpha position of XIII followed by treatment with sodium ethoxide, for example, results in the formation of α-ethoxy-β-(2,4,6-triiodo-3-aminophenyl) propionic acid VI. This compound, which itself falls within the scope of this invention, may be converted to other compounds of general formula I by transformations heretofore described.

With m-hydroxybenzaldehyde as the starting material, the process of obtaining compounds of this invention can be modified as follows:

(8) 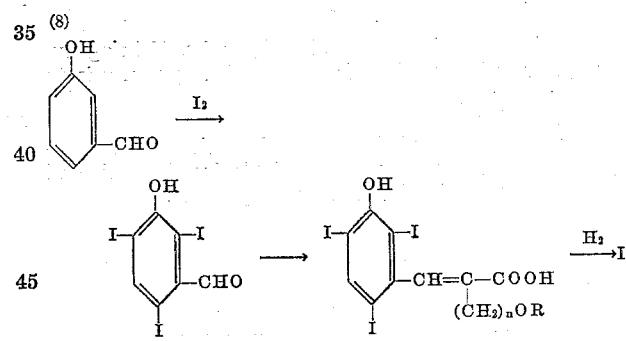

With aminobenzaldehyde, initial iodination followed by condensation, and reduction, yields a further modified procedure represented by the following equations:

(9) 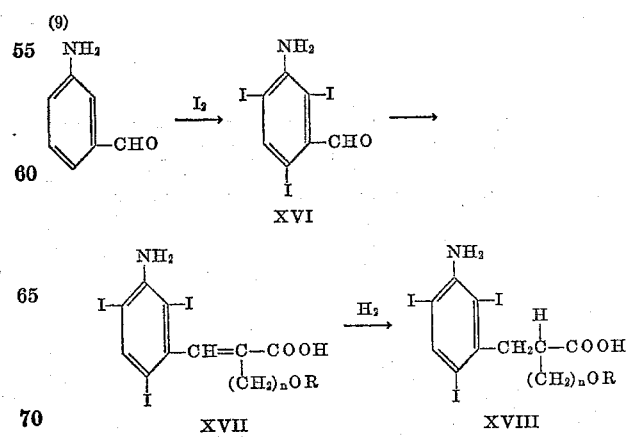

By the procedures described hereinabove (see Equations 3 and 4), the intermediate XVIII on diazotization and hydrolysis will yield X.

Compounds of general Formula I can be obtained also by way of the substituted propionitrile as follows:

(10)

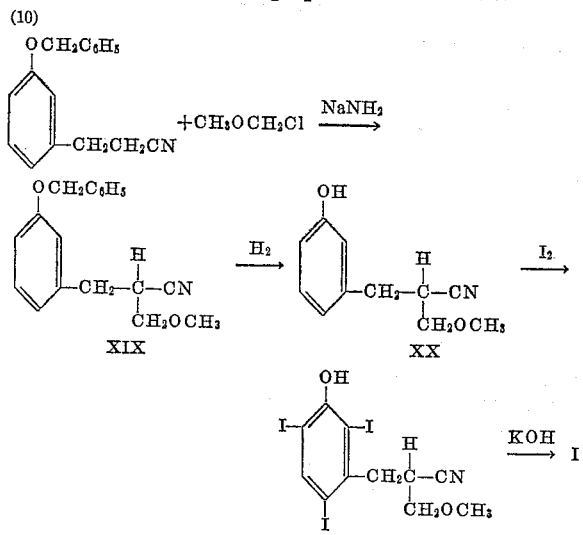

It is to be noted that compound XX may be hydrolyzed to:

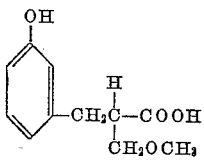

which can be used as an intermediate in some of the aforementioned processes.

The compounds of the present invention are preferably administered in the form of the free acids incorporated in tablets containing the usual binders, such as starch, gums, sugar, and the like. They can also be administered as the non-toxic metal salts, such as the sodium or calcium salts, or as salts of non-toxic organic amines, such as mono-, di-, and tri-ethanolamines and the corresponding propanolamines, diethyl and dipropyl amines, and the like. Another very suitable pharmaceutical form for the compounds of this invention is as a suspension of either the free acids or the salts, such a suspension consisting of a 3 g. dose of the acid, and slightly more of the salt, corresponding to its greater molecular weight. The powdered diagnostic agent can be dissolved or suspended in milk, water, orange juice, or other potable liquid; while the free acids can also be put up in 15 cc. ampules, suspended in water containing methylcellulose or kaolin, or in other suspending or antacid preparations. With an oral dose of about 3 g., a satisfactory X-ray picture can be obtained in about 12 to 24 hours.

The following examples describe in greater detail, and by way of illustration, satisfactory procedures for the preparation of the compounds of this invention.

EXAMPLE I

α-Ethoxy-β-(2,4,6 triiodo-3-aminophenyl) propionic acid

The requisite intermediate, ethoxyacetic anhydride, is prepared as follows: To a stirred solution of 104 g. of ethoxyacetic acid and 79 g. of dry pyridine in 300 ml. of anhydrous ether at —10° is added dropwise a solution of 60 g. of thionyl chloride and 50 ml. of anhydrous ether. The reaction temperature is maintained at —10° during the addition and the mixture is stirred for an additional three hours, allowing the temperature to rise to 0°. After removing the precipitated pyridine hydrochloride by rapid filtration and washing with anhydrous ether, the ether filtrate and washings are evaporated to a residue which is distilled to yield ethoxyacetic anhydride.

A mixture of 25.2 g. of sodium ethoxyacetate, 114 g. of ethoxyacetic anhydride and 30.2 g. of m-nitrobenzaldehyde is stirred and heated at 135–140° for 7 hours. The reaction mixture is cooled and poured into 1.0 liter of water and the precipitated α-ethoxy-m-nitrocinnamic acid is removed by filtration and purified by recrystallization from aqueous methanol. (The substituted cinnamic acid can also be obtained by a reaction in which the potassium salt is substituted for the sodium salt of the ethoxyacetic acid: by the reaction of molar quantities of ethoxyacetic acid, triethylamine, m-nitrobenzaldehyde, and three moles of ethoxyacetic anhydride at 100–105° for 20 hours; or by the reaction of ethoxyacetic anhydride, triethylamine and m-nitrobenzaldehyde at 100–105° for 20 hours.)

A solution of 0.1 mole of α-ethoxy-m-nitrocinnamic acid in 100 ml. of 1-N aqueous sodium hydroxide is treated with hydrogen at 50–70° under 50 lbs. pressure in the presence of palladium-on-charcoal (5%) or Raney nickel catalyst. (The aqueous reduction may be run at higher pressures at room temperature in the presence of the above catalysts. Hydrogenation of the free acid in ethanol solution in the presence of Adams platinum oxide affords the same product.) After removal of the catalyst by filtration, the filtrate from the aqueous reduction is concentrated in vacuo to about 25 ml., neutralized with concentrated hydrochloric acid and diluted to about 65 ml. with 6-N hydrochloric acid. To the stirred acid solution, previously heated to 70°, are added 53.5 g. of iodine monochloride in 125 ml. of 6 N-hydrochloric acid. After one hour, there are added 270 ml. of water over a 15-minute period, while maintaining the reaction temperature at 70° throughout. To the diluted solution there are separately, but simultaneously, added 15 g. of iodine monochloride and 500 ml. of water over a 5-hour period, after which the mixture is cooled and the crude acid removed by filtration. The solids are dissolved in dilute alkali, treated with sodium hydrosulfite, and precipitated by the addition of a saturated solution of sodium chloride. The sodium salt is removed by filtration, dissolved in water and acidified by the addition of sodium bisulfite, whereupon the crude acid precipitates and is removed by filtration. Recrystallization from aqueous alcohol yields α-ethoxy-β-(2,4,6-triiodo-3-aminophenyl) propionic acid.

EXAMPLE II

α-Methoxy-β-(2,4,6-triiodo-3-aminophenyl) propionic acid

For the requisite intermediate, methoxyacetic anhydride, 90 g. of methoxyacetic acid, 79 g. of pyridine and 60 g. of thionyl chloride are reacted as described in Example I.

The intermediate, α-methoxy-m-nitrocinnamic acid, is prepared from 44.8 g. of sodium methoxyacetate, 195 g. of methoxyacetic anhydride and 60.4 g. of m-nitrobenzaldehyde, as described in Example I. A dilute alkaline solution containing 0.2 mole of α-methoxy-m-nitrocinnamic acid is hydrogenated and iodinated with the same molecular proportions of reagents and without isolation of the reduced material as in Example I, to yield α-methoxy-β-(2,4,6-triiodo-3-aminophenyl)propionic acid.

EXAMPLE III

α-n-Amyloxy-β-(2,4,6-triiodo-3-aminophenyl) propionic acid

The intermediate n-amyloxyacetic anhydride is obtained by the reaction of 292 g. of n-amyloxyacetic acid and 158 g. of anhydrous pyridine in 650 ml. of anhydrous ether with 120 g. of thionyl chloride in 50 ml. of anhydrous ether below —10°. The reaction mixture is allowed to stir for 5 hours at 0° before the product is isolated as in Example I.

The requisite α-amyloxy-m-nitrocinnamic acid is obtained from 274 g. of amyloxyacetic anhydride, 75 g. of triethylamine and 75 g. of m-nitrobenzaldehyde as in Example I.

Hydrogenation of 41.8 g. α-amyloxy-m-nitrocinnamic acid is carried out in ethanol solution at 750 lbs. pressure in the presence of Raney nickel catalyst. The reduced acid is iodinated as in Example I and the α-n-amyloxy-β-(2,4,6-triiodo-3-aminophenyl) propionic acid purified by recrystallization from benzene or chloroform.

EXAMPLE IV

*α-Methoxy-β-(2,4,6-triiodo-3-hydroxyphenyl) propionic acid*

Fifty milliliters of an aqueous solution containing 0.1 mole of sodium α-methoxy-m-nitrocinnamate (obtained as in Example II) is hydrogenated as in Example I. After filtration of the catalyst, 17 ml. of concentrated sulfuric acid are added to the filtrate, the solution cooled to 5° and diazotized with 6.7 g. of sodium nitrite in 25 ml. water, the temperature being kept below 5° throughout the reaction. The cold diazonium sulfate solution is added to a boiling solution of 500 ml. water, 41 ml. of concentrated sulfuric acid and 5 ml. of a saturated copper sulfate solution at such a rate that the temperature of the boiling solution remains above 90°. When the evolution of nitrogen is complete, the solution is cooled and extracted with ether. The ethereal solution is washed with salt solution, dried over anhydrous sodium sulfate and evaporated to yield a residue of crude α-methoxy-β-(3-hydroxyphenyl) propionic acid which is used without further purification for the iodination.

To a stirred solution of the crude acid from the diazotization and replacement in 130 ml. of glacial acetic acid is added 58 g. of iodine monochloride in 80 ml. of acetic acid over a period of 1–1.5 hours. After 15 minutes, 400 ml. of water are added dropwise to the solution and stirring is continued for an additional hour. The reaction mixture is heated slowly to 80° and maintained at that temperature for 40 minutes, then allowed to cool. The excess iodine monochloride is destroyed by the addition of solid sodium bisulfite, and the iodinated acid is filtered, washed with water and purified by recrystallization from acetone-water. The α-methoxy-β-(2,4,6-triiodo-3-hydroxyphenyl) propionic acid can also be obtained from the iodination of crude sodium α-methoxy-3-hydroxy-hydrocinnamate with iodine-potassium iodide solution.

Alternately, the α-methoxy-β-(3-hydroxyphenyl) propionic acid can be prepared as follows: Sodium methoxyacetate, methoxy-acetic anhydride and m-hydroxybenzaldehyde in a molar ratio of 1:3:1, are heated, with stirring, at 135–140° for 14 hours. After cooling, the reaction mixture is poured into 4 volumes of water, the precipitated α-methoxy-m-(acetoxy) cinnamic acid extracted with ether, the ethereal solution washed with salt solution, dried and evaporated to a residue. The residue is dissolved in a stoichiometric amount of dilute aqueous alkali and hydrogenated with Raney nickel catalyst at 50 lbs. pressure and room temperature. The catalyst is filtered off and additional alkali added to the filtrate and the solution is refluxed for several hours. The crude α-methoxy-3-hydroxyhydrocinnamic acid (α-methoxy-β-(3-hydroxyphenyl) propionic acid) isolated from the ethereal extract of the acidified hydrolysis solution is identical with that obtained from the diazotization-replacement reaction first described in this example. Iodination of this crude α-methoxy-β-(m-hydroxyphenyl) propionic acid as above described in this example yields the same triiodo compound.

EXAMPLE V

*α-Ethoxy-β-(2,4,6-triiodo-3-hydroxyphenyl) propionic acid*

An aqueous solution containing 0.1 mole of sodium α-ethoxy-m-nitrocinnamate (obtained as in Example I) is hydrogenated and the amino group diazotized and replaced by hydroxyl as in Example IV. The crude α-ethoxy-β-(3-hydroxyphenyl) propionic acid is iodinated with iodine monochloride in acetic acid as in Example IV and the iodinated acid is recrystallized from aqueous alcohol.

EXAMPLE VI

*α-Propoxy-β-(2,4,6-triiodo-3-hydroxyphenyl) propionic acid*

The requisite intermediate propoxyacetic anhydride is prepared from 1 mole of propoxyacetic acid, 1 mole of anhydrous pyridine and 0.5 mole of thionyl chloride as in Example I.

The further intermediate α-propoxy-m-nitrocinnamic acid is obtained from the reaction of 0.2 mole of sodium propoxyacetate, 0.2 mole of m-nitrobenzaldehyde and 0.6 mole of propoxyacetic anhydride as in Example I.

One tenth of a mole of α-propoxy-m-nitrocinnamic acid is reduced, the amino group replaced by hydroxyl and the crude α-propoxy-m-hydroxy hydrocinnamic acid iodinated as in Example IV. The α-propoxy-β-(2,4,6-triiodo-3-hydroxyphenyl) propionic acid is recrystallized from benzene.

EXAMPLE VII

*α-n-Amyloxy-β-(2,4,6-triiodo-3-hydroxyphenyl) propionic acid*

A solution of α-amyloxy-m-nitrocinnamic acid (obtained as in Example III) in aqueous alkali is reduced, the aromatic amine group replaced by hydroxyl through diazotization and the crude α-n-amyloxy-m-hydroxy hydrocinnamic acid iodinated as in Example IV. The obtained α-n-amyloxy-β-(2,4,6-triiodo-3-hydroxyphenyl) propionic acid is purified by recrystallization from aqueous acetone.

EXAMPLE VIII

*α-(2,4,6-triiodo-3-aminobenzyl)-β-methoxy-propionic acid*

The required intermediate β-methoxypropionic anhydride, is prepared from 1 mole of β-methoxypropionic acid as described in Example I. The further intermediate α-(m-nitrobenzal)-β-methoxy-propionic acid is obtained by the reaction of sodium β-methoxypropionate, β-methoxy-propionic anhydride and m-nitrobenzaldehyde, as described in Example I.

Hydrogenation of α-(m-nitrobenzal)-β-methoxy propionic acid in a dilute alkaline solution in the presence of palladium-on-charcoal followed by iodination as in Example I, yields the α-(2,4,6-triiodo-3-aminobenzyl)-β-methoxy-propionic acid. The iodinated acid is purified by recrystallization from aqueous alcohol.

EXAMPLE IX

*α-(2,4,6-triiodo-3-hydroxybenzyl)-β-methoxypropionic acid*

Iodination of the crude α-(m-hydroxybenzyl)-β-methoxypropionic acid obtained through hydrogenation, diazotization and replacement on α-(m-nitrobenzal)-β-methoxypropionic acid (from Example VIII) as in Example IV, yields α-(2,4,6-triiodo-3-hydroxybenzyl)-β-methoxypropionic acid, purified by recrystallization from aqueous alcohol.

EXAMPLE X

*α-(2,4,6-triiodo-3-aminobenzyl)-β-ethoxypropionic acid*

The intermediate β-ethoxypropionic anhydride is prepared from one mole of β-ethoxypropionic acid as described in Example I. The further intermediate α-(m-nitrobenzal)-β-ethoxypropionic acid is obtained from the reaction of the β-ethoxypropionic anhydride, triethylamine and m-nitrobenzaldehyde, as in Example I.

After the reduction of the α-(m-nitrobenzal)-β-ethoxypropionic acid in dilute alkaline solution, the iodination is run without isolation of the intermediate reduction product, as given in Example I. Recrystallization from aqueous alcohol yields α-(2,4,6-triiodo-3-aminobenzyl)-β-ethoxypropionic acid.

EXAMPLE XI

α-(2,4,6-triiodo-3-hydroxybenzyl)-β-ethoxypropionic acid

Reduction of the α-(m-nitrobenzal)-β-ethoxypropionic acid, obtained according to Example X, followed by diazotization and replacement of the amino by hydroxy and iodination of the crude hydroxy acid, as in Example IV, gives the α-(2,4,6-triiodo-3-hydroxybenzyl)-β-ethoxypropionic acid, which can be purified by recrystallization from alcohol and water.

EXAMPLE XII

α-(2,4,6-triiodo-3-aminobenzyl)-β-n-butoxypropionic acid

The intermediate n-butoxypropionic anhydride is obtained from the n-butoxypropionic acid as in Example I. The next intermediate, α-(m-nitrobenzal)β-n-butoxypropionic acid, is prepared from the reaction of the sodium salt of the acid, the anhydride and m-nitrobenzaldehyde, as described in Example I.

Reduction of the above Perkin product in alkaline solution in the presence of palladium on charcoal yields the crude α-(3-aminobenzyl)-β-n-butoxypropionic acid which is then iodinated with iodine monochloride as given in Example I. The triiodo acid is recrystallized from chloroform or benzene.

EXAMPLE XIII

α-(2,4,6-triiodo-3-hydroxybenzyl)-β-isoamyloxypropionic acid

The required β-isoamyloxypropionic anhydride is prepared from the corresponding acid by reaction with pyridine and thionyl chloride, as described in Example I. The anhydride is then converted into α-(m-nitrobenzal)-β-isoamyloxypropionic acid by reaction with triethylamine and m-nitrobenzaldehyde, as in Example I.

After hydrogenation of the α-(m-nitrobenzal)-β-isoamyloxypropionic acid, the crude amino compound is diazotized and treated with sulfuric acid, and thereafter iodinated, as in Example IV. Recrystallization from acetone-water gives pure α-(2,4,6-triiodo-3-hydroxybenzyl)-β-isoamyloxy-propionic acid.

EXAMPLE XIV

α-(2,4,6-triiodo-3-aminobenzyl)-γ-methoxybutyric acid

The intermediate γ-methoxybutyric anhydride is prepared from the γ-methoxybutyric acid as in Example I. There is then formed the α-(m-nitrobenzal)-γ-methoxybutyric acid through the Perkin reaction of the potassium salt of the acid, the anhydride and m-nitrobenzaldehyde, as in Example I.

After reduction of the α-(m-nitrobenzal)-γ-methoxybutyric acid in alkaline solution, the iodination is performed without isolation of the intermediate reduction product, as in Example I. The α-(2,4,6-triiodo-3-aminobenzyl-γ-methoxybutyric acid is purified by recrystallization from aqueous alcohol.

EXAMPLE XV

α-(2,4,6-triiodo-3-hydroxybenzyl)-γ-methoxybutyric acid

Hydrogenation of α-(m-nitrobenzal)-γ-methoxybutyric acid (obtained as in Example XIV) followed by diazotization, replacement and iodination, as described in Example IV, yields α-(2,4,6-triiodo-3-hydroxybenzyl)-γ-methoxybutyric acid, which is purified by recrystallization from aqueous alcohol.

EXAMPLE XVI

α-(2,4,6-triiodo-3-aminobenzyl)-γ-ethoxybutyric acid

The intermediate-γ-ethoxybutyric anhydride is prepared from the corresponding acid as described in Example I. The anhydride is then converted into α-(m-nitrobenzal)-γ-ethoxybutyric acid via the Perkin reaction as in Example I.

The α-(2,4,6-triiodo-3-aminobenzyl)-γ-ethoxybutyric acid is obtained from the reduction of the α-(m-nitrobenzal)-γ-ethoxybutyric acid followed by iodination, as in Example I. The iodinated acid is recrystallized from aqueous acetone.

EXAMPLE XVII

α-(2,4,6-triiodo-3-hydroxybenzyl)-γ-ethoxybutyric acid

Hydrogenation of α-(m-nitrobenzal)-γ-ethoxybutyric acid (obtained as in Example XVI), reaction with sodium nitrite, then decomposition of the diazonium salt with hot sulfuric acid as in Example IV, yields the crude α-(m-hydroxybenzyl)-γ-ethoxybutyric acid. Iodination of the crude hydroxy compound (as in Example IV) yields α-(2,4,6 - triiodo-3-hydroxybenzyl)-γ-ethoxybutyric acid which is recrystallized from benzene.

EXAMPLE XVIII

α-(2,4,6-triiodo-3-aminobenzyl)-γ-butoxybutyric acid

The intermediate γ-butoxybutyric anhydride is prepared from γ-butoxybutyric acid, pyridine and thionyl chloride, as described in Example I.

The requisite α-(m-nitrobenzal)-γ-butoxybutyric acid is obtained from the reaction of the γ-butoxybutyric anhydride, triethylamine and m-nitrobenzaldehyde, as described in Example I.

Reduction of an aqueous alkaline solution of α-(m-nitrobenzal)-γ-butoxybutyric acid followed by iodination with iodine monchloride as in Example I, yields α-(2,4,6-triiodo-3-aminobenzyl)-γ-butoxybutyric acid, which is recrystallized from benzene or chloroform.

EXAMPLE XIX

α-(2,4,6-triiodo-3-hydroxybenzyl)-γ-propoxybutyric acid

The requisite intermediate γ-propoxybutyric anhydride is prepared from the corresponding acid, as in Example I.

The requisite α-(m-nitrobenzal)-γ-propoxybutyric acid is obtained by the Perkin reaction, as in Example I.

Hydrogenation of the Perkin product followed by diazotization and replacement of the amino group by hydroxy, then iodination (as in Example IV) yields α-(2,4,6-triiodo-3-hydroxybenzyl)-γ-propoxybutyric acid. The iodinated acid is recrystallized from aqueous alcohol.

EXAMPLE XX

α-(2,4,6-triiodo-3-aminobenzyl)-δ-methoxy valeric acid

The intermediate substituted valeric anhydride is prepared from the δ methoxy-valeric acid, as described in Example I.

The required α-(m-nitrobenzal)-δ-methoxy-valeric acid is obtained from the reaction of δ methoxy-valeric anhydride, triethylamine and m-nitro benzaldehyde, as in Example I.

Reduction of the intermediate Perkin product followed by iodination as in Example I, yields α-(2,4,6-triiodo-3-aminobenzyl) δ methoxy-valeric acid which is recrystallized from aqueous alcohol.

EXAMPLE XXI

α-(2,4,6-triiodo-3-hydroxybenzyl)-δ-ethoxy valeric acid

The required δ-ethoxyvaleric anhydride is obtained from the corresponding alkoxy acid, as in Example I.

The intermediate α-(m-nitrobenzal)-δ-ethoxyvaleric acid is prepared by the reaction of δ-ethoxyvaleric acid, triethylamine, δ-ethoxy valeric anhydride and m-nitrobenzaldehyde, as in Example I.

Reduction of the intermediate α-(m-nitrobenzal) δ-ethoxy valeric acid, diazotization, replacement of the amino group by hydroxy and iodination with iodinemonochloride in acetic acid (as in Example IV) yields α-(2,4,6-triiodo-3-hydroxybenzyl)-δ-ethoxyvaleric acid, recrystallized from benzene or chloroform.

EXAMPLE XXII

α - (2,4,6 - triiodo - 3 - aminozenzyl) - ε - methoxycaproic acid

The requisite δ-butoxyvaleric anhydride is obtained from the δ-butoxyvaleric acid, as described in Example I.

The requisite intermediate, α-(m-nitrobenzal)-δ-butoxyvaleric acid is formed in the reaction of sodium δ-butoxyvalerate, δ-butoxyvaleric anhydride and m-nitrobenzaldehyde, as in Example I.

Reduction of an aqueous alkaline solution of δ-(m-nitrobenzal)-δ-butoxyvaleric acid and iodination without isolation of the intermediate reduction product (as in Example I) gives α-(2,4,6-triiodo-3-aminobenzyl)-δ-butoxyvaleric acid. The iodinated acid is purified by recrystallization from aqueous acetone.

EXAMPLE XXIII

α - (2,4,6 - triiodo - 3 - aminobenzyl) - ε - methoxycaproic acid

The required ε-methoxycaproic anhydride is obtained from the corresponding acid, as described in Example I. The anhydride is converted into α-(m-nitrobenzal)-ε-methoxycaproic acid by reaction with triethylamine and m-nitrobenzaldehyde, as described in Example I.

After hydrogenation of the α-(m-nitrobenzal)-ε-methoxycaproic acid and iodination, without isolation of the intermediate reduction product, the α-(2,4,6-triiodo-3-aminobenzyl)-ε-methoxycaproic acid is obtained and is recrystallized from aqueous alcohol.

EXAMPLE XXIV

α - (2,4,6 - triiodo - 3 - hydroxybenzyl) - ε - ethoxycaproic acid

The requisite ε-ethoxycaproic anhydride is prepared from the corresponding acid by reaction with pyridine and thionyl chloride as in Example I.

The intermediate α-(m-nitrobenzal)-ε-ethoxycaproic acid is obtained by the reaction of potassium ε-ethoxycaproate, ε-ethoxycaproic anhydride and m-nitrobenzal dehyde, as described in Example I.

After reduction of the α-(m-nitrobenzal)-ε-ethoxycaproic acid, diazotization and replacement of the amino group by hydroxy, and iodination with iodine monochloride in acetic acid, as described in Example IV, the α - (2,4,6 - triiodo - 3 - hydroxybenzyl) - ε - ethoxycaproic acid is obtained. The iodinated acid is purified by recrystallization from benzene.

EXAMPLE XXV

α - Methoxy - β - (2,4,6 - triiodophenyl) propionic acid

To a vigorously stirred solution of 5.7 g. of α-methoxy-β-(2,4,6-triiodo-3-aminophenyl) propionic acid (obtained as in Example II) in 50 ml. of concentrated sulfuric acid cooled to 0°, there is added 0.75 g. of finely powdered sodium nitrite. After an additional two hours at 0°, the reaction mixture is poured on to approximately 100 g. of ice, the temperature being kept below 5°. The slurry formed is gradually added to a cooled, vigorously stirred suspension of 2.8 g. of cuprous oxide in 210 ml. of 95% ethanol. When the initial evolution of nitrogen has subsided, the mixture is refluxed until no further nitrogen is evolved, then diluted with an equal volume of water and allowed to remain overnight at room temperature. Filtration of the precipitate followed by ether extraction of the solids, washing of the ethereal solution with sodium thiosulfate solution and evaporation of the solvent yields α-methoxy-β-(2,4,6-triiodophenyl) propionic acid, which is purified by recrystallization from benzene-hexane.

EXAMPLE XXVI

α-Methoxy-β-(2,3,4,6-tetraiodophenyl) propionic acid

A solution of 5.7 g. of α-methoxy-β-(2,4,6-triiodo-3-aminophenyl) propionic acid (obtained as in Example II) is diazotized in 30 ml. of concentrated sulfuric acid with 2.1 g. of sodium nitrite as in Example XXV. A solution of 12.7 g. of potassium iodide in 28 ml. of water is added to the cold aqueous slurry of the diazonium salt; and after the initial vigorous reaction has subsided, the mixture is heated on the steam bath for one hour. It is then poured into a cold sodium bisulfite solution and the crude α-methoxy-β-(2,3,4,6-tetraiodophenyl) propionic acid is filtered and recrystallized from acetone-water.

EXAMPLE XXVII

α-Methoxy-β-(2,4,6-triiodo-3-methoxyphenyl) propionic acid

A solution of 25 g. of the hydroxy compound obtained in Example IV in 250 ml. 10% sodium hydroxide is treated with 75 ml. of dimethyl sulfate. At this stage the reaction mixture is diluted to 750 ml. and an additional 25 ml. of dimethyl sulfate is added. The dimethyl sulfate is added in such a manner that several times during the process the reaction mixture becomes slightly acid. After allowing the mixture to stand overnight, it is poured into 500 ml. of water whereupon solids are formed. The crude material is extracted with ether and the ether is dried and evaporated. Upon recrystallization of the residue from alcohol, there is obtained the compound of this example.

In a similar manner the following compounds are prepared: α-ethoxy-β-(2,4,6-triiodo-3-methoxyphenyl) propionic acid, α-propoxy-β-(2,4,6-triiodo-3-methoxyphenyl) propionic acid, α-n-amyloxy-β-(2,4,6-triiodo-3-methoxyphenyl) propionic acid, α-(2,4,6-triiodo-3-methoxybenzyl)-β-methoxy propionic acid, α-(2,4,6-triiodo-3-methoxybenzyl)-β-methoxy butyric acid.

In order to prepare alkoxy compounds other than methoxy, the corresponding alkyl halide is used in place of the dimethyl sulfate. It is advantageous to use 10% sodium hydroxide in 50% alcohol in order to maintain all components in solution. Using the appropriate alkyl bromide the following compounds are prepared: α-methoxy-β-(2,4,6-triiodo-3-isopropoxyphenyl) propionic acid, α-ethoxy-β-(2,4,6-triiodo-3-ethoxyphenyl) propionic acid, α - 2,4,6 - triiodo - 3 - propoxybenzyl) - β - methoxy propionic acid.

EXAMPLE XXVIII

α - Ethoxy - β - (2,4,6 - triiodo - 3 - acetyloxyphenyl) propionic acid

By reacting equimolar quantities of the compound obtained in Example V, acetyl chloride and pyridine in benzene solution there is obtained the acetyloxy compound of this example. The reaction mixture is refluxed for several hours and upon cooling the acetyloxy compound separates. The crude product is removed by filtration, washed thoroughly with water and recrystallized from aqueous alcohol.

In a similar manner there is obtained the propionyloxy, butyryloxy, benzoyloxy, by using the appropriate acyl halide in place of acetyl chloride.

It is evident from the foregoing that treating the hydroxy compounds described in the foregoing examples with an acyl halide as above described yields the various acyloxy derivatives of this invention.

EXAMPLE XXIX

α-Ethoxy-β-(2,4,6-triiodo-3-acetylaminophenyl) propionic acid

A solution of 20 g. of the amino acid obtained from Example I in 50 ml. of acetic anhydride containing 10 drops of concentrated sulfuric acid is heated on a steam bath for 5 hours. The reaction mixture is poured into ice and warmed on a steam bath to hydrolyze the excess acetic anhydride. The solid material is removed by filtration and recrystallized from ethyl acetate-acetone.

In a similar manner the following compounds are prepared: α-methoxy-β-(2,4,6-triiodo-3-acetyliminophenyl) propionic acid, α-(2,4,6-triiodo-3-acetylaminobenzyl)-β-methoxy propionic acid.

It is evident from the foregoing that by employing anhydrides of other acids such as propionic anhydride, butyric anhydride, and the like, the corresponding acylamino compounds are obtained.

In each of the above examples, the obtained acids can be neutralized in known manner with a metal base to form the metal salts, like the sodium, potassium, calcium and magnesium salts, or with an amine, such as any of those referred to hereinabove.

We claim:

1. A compound of the class consisting of acids of the formula

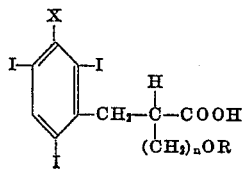

and their alkali metal, alkaline earth metal, lower alkylamine and lower alkylolamine salts X being a member of the group consisting of hydroxy and amino, while R is a lower alkyl group, and $n$ is an integer from 0 to 2, the group —$(CH_2)_nOR$ containing from 1 to 4 carbon atoms, said compound on oral administration being effective in visualizing the gall bladder on X-ray examination.

2. Compounds as defined in claim 1, wherein X is OH.
3. Compounds as defined in claim 1, wherein X is $NH_2$.
4. Compounds as defined in claim 1, wherein $n$ is 0.
5. Compounds as defined in claim 1, wherein $n$ is 1.
6. Compounds as defined in claim 1, wherein $n$ is 2.
7. α-Ethoxy-β-(2,4,6-triiodo-3-aminophenyl) propionic acid.
8. α-Ethoxy-β-(2,4,6-triiodo-3-hydroxyphenyl) propionic acid.

References Cited in the file of this patent

UNITED STATES PATENTS 2,705,726    Archer _____ Apr. 5, 1955

OTHER REFERENCES

Lewis et al.: J.A.C.S., vol. 71, pages 3753–5 (1949).